US010814533B2

(12) United States Patent
Louie et al.

(10) Patent No.: US 10,814,533 B2
(45) Date of Patent: Oct. 27, 2020

(54) SYSTEMS AND METHODS FOR APPLYING VACUUM PRESSURE TO COMPOSITE PARTS

(71) Applicant: The Boeing Company, Chicago, IL (US)

(72) Inventors: Michael K. Louie, Renton, WA (US); Kenneth M. Dull, Puyallup, WA (US); Gagandeep Saini, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 429 days.

(21) Appl. No.: 15/827,215

(22) Filed: Nov. 30, 2017

(65) Prior Publication Data

US 2019/0160714 A1 May 30, 2019

(51) Int. Cl.
*B29C 70/44* (2006.01)
*F16K 15/06* (2006.01)
(Continued)

(52) U.S. Cl.
CPC ...... *B29C 43/3642* (2013.01); *B29C 43/3607* (2013.01); *B29C 70/44* (2013.01); *B29C 70/443* (2013.01); *B32B 37/1009* (2013.01); *F16K 15/06* (2013.01); *F16K 15/063* (2013.01); *F16L 37/0982* (2013.01); *B29C 2043/3644* (2013.01); *B32B 37/1018* (2013.01)

(58) Field of Classification Search
CPC ............ B29C 2043/3644; B29C 70/44; B29C 70/443; B29C 70/446; F16K 15/06; F16K 15/063; B32B 37/1009; B32B 37/1018

USPC ........................................... 251/149.1, 149.6
See application file for complete search history.

(56) References Cited

U.S. PATENT DOCUMENTS 4,378,028 A   3/1983 Weber et al.
4,512,766 A * 4/1985 Vailancourt ........... A61M 39/14
                                              251/149.1
(Continued)

FOREIGN PATENT DOCUMENTS

GB       2476870 A        7/2011
JP    2004203021 A  *    7/2004
(Continued)

OTHER PUBLICATIONS

Extended European Search Report dated Mar. 20, 2019 in European Application No. 18193041.3 (European counterpart of the instant application).

(Continued)

*Primary Examiner* — Atul P. Khare
(74) *Attorney, Agent, or Firm* — Ostrager Chong Flaherty & Broitman P.C.

(57) ABSTRACT

A vacuum probe comprises a sharpened body that is displaceable downward and toward a vacuum bag during vacuum hose quick connection. The sharpened body and a valve element inside the vacuum probe move in tandem until the sharpened body projects outside the vacuum probe. A vacuum pressure applied via the vacuum hose pulls the vacuum bag upwards and towards the projecting sharpened body, which then punctures the vacuum bag, thereby enabling air under the vacuum bag to be evacuated via the vacuum probe as vacuum pressure continues to be applied.

23 Claims, 6 Drawing Sheets

(51) Int. Cl.
  *B32B 37/10* (2006.01)
  *B29C 43/36* (2006.01)
  *F16L 37/098* (2006.01)

(56) References Cited

U.S. PATENT DOCUMENTS

| | | | |
|---|---|---|---|
| 4,917,353 A | | 4/1990 | Riley |
| 4,982,761 A | | 1/1991 | Kreczko et al. |
| 5,322,719 A | * | 6/1994 | Westling ............... B29C 43/203 |
| | | | 269/20 |
| 5,576,030 A | * | 11/1996 | Hooper ................. B29C 70/443 |
| | | | 264/257 |
| 5,885,513 A | * | 3/1999 | Louderback ........ B29C 35/0266 |
| | | | 264/257 |
| 6,234,450 B1 | * | 5/2001 | Jeory ...................... F16L 55/07 |
| | | | 137/223 |
| 6,623,672 B2 | * | 9/2003 | McCollum ............ B29C 70/443 |
| | | | 264/257 |
| 6,669,168 B2 | | 12/2003 | Scheffel |
| 7,093,612 B2 | | 8/2006 | Greene et al. |
| 8,048,039 B2 | * | 11/2011 | Carlyon ................ A61M 39/06 |
| | | | 604/246 |
| 8,557,167 B2 | * | 10/2013 | Kanemasu ............ B29C 73/025 |
| | | | 264/333 |
| 8,944,082 B2 | * | 2/2015 | Cairns ................... A61M 39/18 |
| | | | 137/1 |
| 8,986,479 B2 | * | 3/2015 | Evens ..................... B29C 73/32 |
| | | | 156/94 |
| 9,579,873 B2 | * | 2/2017 | Hanks .................... B29C 73/10 |
| 2005/0079241 A1 | * | 4/2005 | Moore ................. B29C 70/086 |
| | | | 425/388 |
| 2013/0059022 A1 | | 3/2013 | Kanemasu et al. |
| 2014/0234458 A1 | * | 8/2014 | Dierkes ................. B29C 33/00 |
| | | | 425/146 |

FOREIGN PATENT DOCUMENTS

| | | |
|---|---|---|
| JP | 2015217532 A | 12/2015 |
| WO | WO-9114564 A1 * 10/1991 | ......... B29C 43/3607 |

OTHER PUBLICATIONS

Nikolic et al., "A UAV System for Inspection of Industrial Facilities," Aerospace Conference, 2013 IEEE, Mar. 2-9, 2013.

* cited by examiner

SYSTEMS AND METHODS FOR APPLYING VACUUM PRESSURE TO COMPOSITE PARTS

BACKGROUND

This disclosure relates to manufacturing of parts made of composite material. In particular, this disclosure relates to applying vacuum pressure to composite parts made of fiber-reinforced plastic material.

The use of fiber reinforced/resin matrix composite materials in the manufacture of articles and components is becoming increasingly widespread in a number of industries, including the aircraft industry. Such composite materials include, for example, carbon fiber-reinforced/epoxy resin matrix materials and glass fiber-reinforced/polyimide resin matrix materials. In a common manufacturing procedure for producing articles and components from composite materials, a plurality of layers of the material, typically called a "lay-up", are held on a tool, and the tool with the lay-up thereon is placed in an autoclave, which applies heat and pressure, to cure the resin matrix. During the curing process, the lay-up is covered by an impermeable, flexible film, often referred to as the "vacuum bag" and sealed to the tool with a vacuum bag sealant. In this way, the autoclave pressure is transmitted uniformly over the surface of the lay-up. The uniform pressure produces a high-quality finished article or component and is particularly important in the manufacture of aircraft parts which must meet stringent tolerance limitations and/or structural strength requirements. In preparation for the curing procedure, a vacuum probe (a.k.a. vacuum port) is placed in fluid communication with a sealed space underneath the vacuum bag and connected to a vacuum line. A vacuum is drawn through the line and the probe to evacuate air between the vacuum bag and the lay-up. This presses the vacuum bag against the lay-up so that the desired uniform pressure will be achieved.

When vacuum is used to extract air from between the tool and vacuum bag using a matrix of breather material, a pressure differential is created. This differential creates a pressure from the outside the vacuum bag pressing on the lay-up. When placed in an autoclave with higher pressure and heat, these higher pressures are transferred to the lay-up. Currently, in a typical composite part/vacuum bag setup, air and volatiles are removed from the lay-up side of the vacuum bag through one or more vacuum probes. These probes require bases to be installed inside the composite vacuum bag. The vacuum probes and vacuum line system are used to maintain the pressure differential.

Heated volatiles and moisture can overload the vacuum system. Also leaks in the system can affect the lay-up quality. The use of additional vacuum probes ensures sufficient vacuum is applied to composite parts and helps to minimize these effects. Frequently, if a technician wants to apply additional vacuum, the technician pulls up a portion of the vacuum bag sealant to insert an additional vacuum probe base. This process disturbs the existing vacuum condition in the bag. For complex parts, adding probes may not be possible or may require the technician to rework the vacuum bag in many areas due to the loss of vacuum. Adding new probes may also deform the bag, remove existing bag pleats, or introduce bag wrinkles. There is a need for improved systems and methods for applying sufficient vacuum to composite parts, for example, through the addition of vacuum probes in a vacuum bagged part.

SUMMARY

The subject matter disclosed in detail below is directed to systems and methods for applying vacuum pressure to composite parts. In accordance with some embodiments, a vacuum probe can be produced specifically for adding on the exterior surface of a vacuum bag. The vacuum probe incorporates a device that punctures the vacuum bag during the process of connecting the vacuum probe to a vacuum source by means of a vacuum hose, e.g., during a quick connect/disconnect coupling of the male end of the vacuum probe and the female end of the vacuum hose by inserting the former into the latter. In accordance with other embodiments, some existing vacuum probes having an externally threaded portion for threaded coupling with a base that can be modified or supplemented to produce a similar effect without using the base.

In accordance with the aforementioned embodiments, when a vacuum probe is added and sealed to the exterior surface of the vacuum bag using vacuum bag sealant tape in the shape of a donut, the vacuum probe itself becomes a sealed-off environment. [As used herein, the term "donut-shaped" means having a shape of a continuous mass of material that surrounds and bounds an open volume.] The vacuum probe comprises a sharpened body that is recessed slightly for safety reasons, but is displaced downward and toward the vacuum bag during vacuum hose quick connection. When connected, the sharpened body and a valve element move in tandem in the vacuum channel until the sharpened body projects outside the vacuum probe. A vacuum pressure applied via the vacuum hose pulls the vacuum bag upwards and towards the sharpened body, which punctures the vacuum bag, thereby enabling air under the vacuum bag to be evacuated via the added vacuum probe as vacuum pressure continues to be applied.

Although various embodiments of systems and methods for applying vacuum pressure to composite parts are described in some detail later herein, one or more of those embodiments may be characterized by one or more of the following aspects.

One aspect of the subject matter disclosed in detail hereinafter is a method for applying vacuum pressure to a composite part, comprising: (a) placing a composite part on a tool; (b) placing a flexible sealant tape on the tool along a perimeter that surrounds the composite part; (c) laying a vacuum bag over the composite part and in contact with the sealant tape; (d) placing a vacuum probe overlying a portion of the vacuum bag with sealing material disposed between the vacuum probe and the vacuum bag, the vacuum probe comprising a sharpened body; (e) coupling a vacuum hose to an end of the vacuum probe in a manner that causes a valve element to separate from a valve seat inside a vacuum channel of the vacuum probe; and (f) applying a vacuum pressure inside the vacuum channel by way of the vacuum hose, as a result of which a portion of the vacuum bag surrounded by the sealing material is pulled toward and punctured by the sharpened body. In accordance with some embodiments, coupling the vacuum hose to the end of the vacuum probe also causes the sharpened body to move in tandem with the valve element in a direction away from the valve seat until the sharpened body protrudes outside the vacuum channel and into a space overlying the vacuum bag. In one proposed implementation, step (e) comprises inserting a male quick connect/disconnect coupling element of the vacuum probe into a female quick connect/disconnect coupling element of the vacuum hose.

In accordance with some embodiments of the method described in the preceding paragraph, the vacuum probe comprises an externally threaded portion that projects into a space bounded by the sealing material. In accordance with one embodiment, the method further comprises threadably coupling an internally threaded end cap to the externally threaded portion of the vacuum probe, wherein the sharpened body projects through an opening in and is axially displaceable relative to the internally threaded end cap. In accordance with another embodiment, the method further comprises inserting a portion of a plug made of porous material in a portion of the vacuum channel disposed in the externally threaded portion of the vacuum probe, wherein the sharpened body projects from the plug.

Another aspect of the subject matter disclosed in detail hereinafter is a vacuum probe comprising: a vacuum channel having an axis and first and second openings at opposite ends thereof; and a sharpened body that points away from the first opening of the vacuum channel and projects outside of the vacuum channel in a vicinity of the second opening of the vacuum channel.

In accordance with some embodiments, the vacuum probe further comprises: a valve seat surrounding the first opening of the vacuum channel; a valve element that is axially displaceable in the vacuum channel between first and second axial positions, the valve element being in contact with the valve seat while in the first axial position and being separated from the valve seat while in the second axial position; and a rod disposed in the vacuum channel, the rod having a first end to which the sharpened body is fixedly coupled and a second end that is either connected to or in abutment with the valve element. In these embodiments, the sharpened body is axially displaceable in tandem with the valve element as the valve element moves toward the second axial position and projects outside the vacuum channel when the valve element is in the second axial position.

In cases where the second end of the rod is connected to the valve element, the vacuum probe further comprises an air-permeable sharpened body support element to which the first end of the rod and the sharpened body are affixed. In one proposed implementation, the air-permeable sharpened body support element is a disk having at least one through-hole. In cases where the second end of the rod is in abutment with the valve element, the vacuum probe further comprises a spring that urges the rod toward the valve element.

In accordance with some embodiments, the vacuum probe further comprises an externally threaded portion projecting downward from a bottom of the vacuum probe. In one proposed implementation, the vacuum probe further comprises an internally threaded end cap threadably coupled to the externally threaded portion and a chamber affixed to the internally threaded end cap, wherein the internally threaded end cap comprises an opening through which the sharpened body passes, while the chamber comprises an opening through which the rod passes. To facilitate the flow of air through the vacuum probe during evacuation, the internally threaded end cap may comprise through-holes which allow air to flow into the chamber, while the chamber may comprise through-holes which allow air to flow out of the chamber and into the vacuum channel. In another proposed implementation, the vacuum probe further comprises an air-permeable sharpened body support element in the form of a porous plug seated inside the portion of the vacuum channel that is disposed in the externally threaded portion and to which the sharpened body is affixed.

A further aspect of the subject matter disclosed in detail hereinafter is a system for applying vacuum pressure to a composite part, comprising: a tool that supports a composite part; a vacuum bag overlying the composite part; a flexible sealant tape that seals the vacuum bag to the tool along a perimeter that surrounds the composite part; sealing material on an exterior surface of the vacuum bag within the perimeter and separated from the composite part; a vacuum probe on top of the sealing material; and a vacuum hose coupled to an end of the vacuum probe in a manner that causes a valve element of the vacuum probe to axially displace from the first axial position to the second axial position during coupling. The vacuum probe comprises a vacuum channel having an axis and first and second openings at opposite ends thereof, a valve seat surrounding the first opening, a valve element that is axially displaceable in the vacuum channel between a first axial position in contact with the valve seat and a second axial position separated from the valve seat, and a sharpened body that points away from the first opening of the vacuum channel and projects outside of the vacuum channel in a vicinity of the second opening of the vacuum channel.

In accordance with some embodiments, the system further comprises a rod having a first end to which the sharpened body is fixedly coupled and a second end that is either connected to or in abutment with the valve element, wherein the sharpened body is axially displaceable in tandem with the valve element as the valve element moves toward the second axial position and projects into a space surrounded by the sealing material when the valve element is in the second axial position. In cases where the second end of the rod is connected to the valve element, the vacuum probe further comprises an air-permeable sharpened body support element to which the first end of the rod and the sharpened body are affixed. In cases where the second end of the rod abuts the valve element, the vacuum probe further comprises: an externally threaded portion projecting into the space surrounded by the sealing material; an internally threaded end cap threadably coupled to the externally threaded portion of the vacuum probe; and a chamber affixed to the internally threaded end cap, wherein the internally threaded end cap comprises an opening through which the sharpened body passes, while the chamber comprises an opening through which the rod passes.

Other aspects of systems and methods for applying vacuum pressure to composite parts are disclosed below.

BRIEF DESCRIPTION OF THE DRAWINGS

The features, functions and advantages discussed in the preceding section can be achieved independently in various embodiments or may be combined in yet other embodiments. Various embodiments will be hereinafter described with reference to drawings for the purpose of illustrating the above-described and other aspects. None of the diagrams briefly described in this section are drawn to scale.

Reference will hereinafter be made to the drawings in which similar elements in different drawings bear the same reference numerals.

DETAILED DESCRIPTION

For the purpose of illustration, systems and methods for applying vacuum pressure to composite parts will now be described in some detail. However, not all features of an actual implementation are described in this specification. A person skilled in the art will appreciate that in the development of any such embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1:
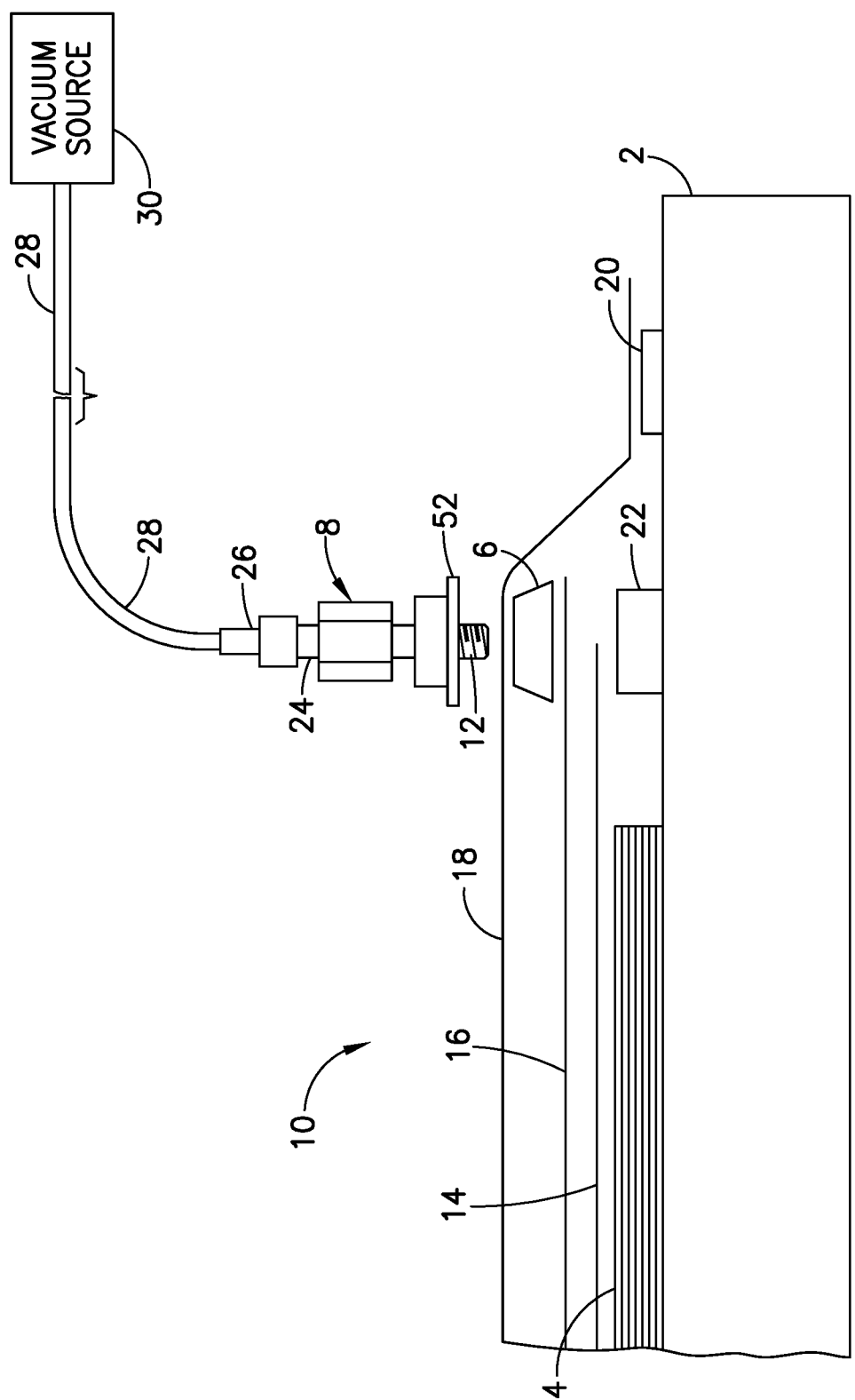
FIG. 1 is a diagram representing an exploded side view of a vacuum bag assembly for evacuating a sealed space underneath a vacuum bag and surrounding a composite part laid on a tool.

FIG. 1 is a diagram representing an exploded side view of a typical vacuum bag assembly 10 for evacuating a sealed space underneath a vacuum bag 18 and surrounding a composite part 4 laid on a tool 2. A release film 14 overlies the composite part 4. A breather cloth 16 overlies the release film. (As used herein, the term "breather" means a porous material.) In turn, a vacuum bag 18 (made, e.g., of a sheet of nylon film) covers the breather cloth 16. The vacuum bag 18 is typically sealed to the surface of tool 2 by sealing tape 20 which surrounds the breather cloth 16 and the composite part 4. In an unevacuated state, the vacuum bag 18 fits loosely over the breather cloth 16, leaving open space therebetween.

Still referring to FIG. 1, the outer peripheries of the release film 14 and breather cloth 16 are sandwiched between an edge breather 22 (placed on the tool 2) and a vacuum probe base 6 having an internal threads for threadably engaging an externally threaded portion 12 of a vacuum probe 8. Typically the release film 14 does not end at the same place as the breather 16 and the edge breather 22. It will usually end halfway over the edge breather 22 or prior to it. This is because the breather 16 should make contact with the edge breather 22 to facilitate air flow. If the release film 14 is non-porous, the release film 14 can cut off flow.

The coupling of the vacuum probe 8 to the vacuum probe base 6 is accomplished by forming an opening (not shown) in the vacuum bag 18, through which the externally threaded portion 12 of vacuum probe 8 is passed and then screwed into an internally threaded hole in the vacuum probe base 6. When vacuum probe 8 and vacuum probe base 6 are assembled (not shown in FIG. 1), the opening in the vacuum bag 18 is sealed by a sealant gasket 52, which is made of a compressible material that is squeezed between opposing surfaces of vacuum probe 8 and vacuum probe base 6 to seal around the opening in the vacuum bag 18.

The vacuum probe 8 is connected to a vacuum source 30 by means of a vacuum hose 28. A common type of coupling used to connect a vacuum hose 28 to a vacuum probe 8 is a valved quick connect/disconnect coupling. The structure and operation of various types of valved quick connect/disconnect couplings are well known, including many such couplings which are commercially available from Swagelok Company, Solon, Ohio. More specifically, detailed descriptions of various valved quick connect/disconnect couplings can be found in U.S. Pat. Nos. 4,378,028, 4,982,761 and 6,669,168, which patents are assigned to Swagelok Company. In the example, depicted in FIG. 1, the vacuum hose 28 is coupled to the vacuum probe 8 by inserting a male quick connect/disconnect coupling element 24 disposed at one end of the vacuum probe 8 into a female quick connect/disconnect coupling element 26 disposed at one end of the vacuum hose 28. The female quick connect/disconnect coupling element 26 in turn incorporates a valve core (not shown in the drawings) that comes into contact with and then pushes inward a valve element (not shown in FIG. 1, but see valve element 38 in FIG. 2) that is incorporated in the vacuum probe 8.

Figure 2:
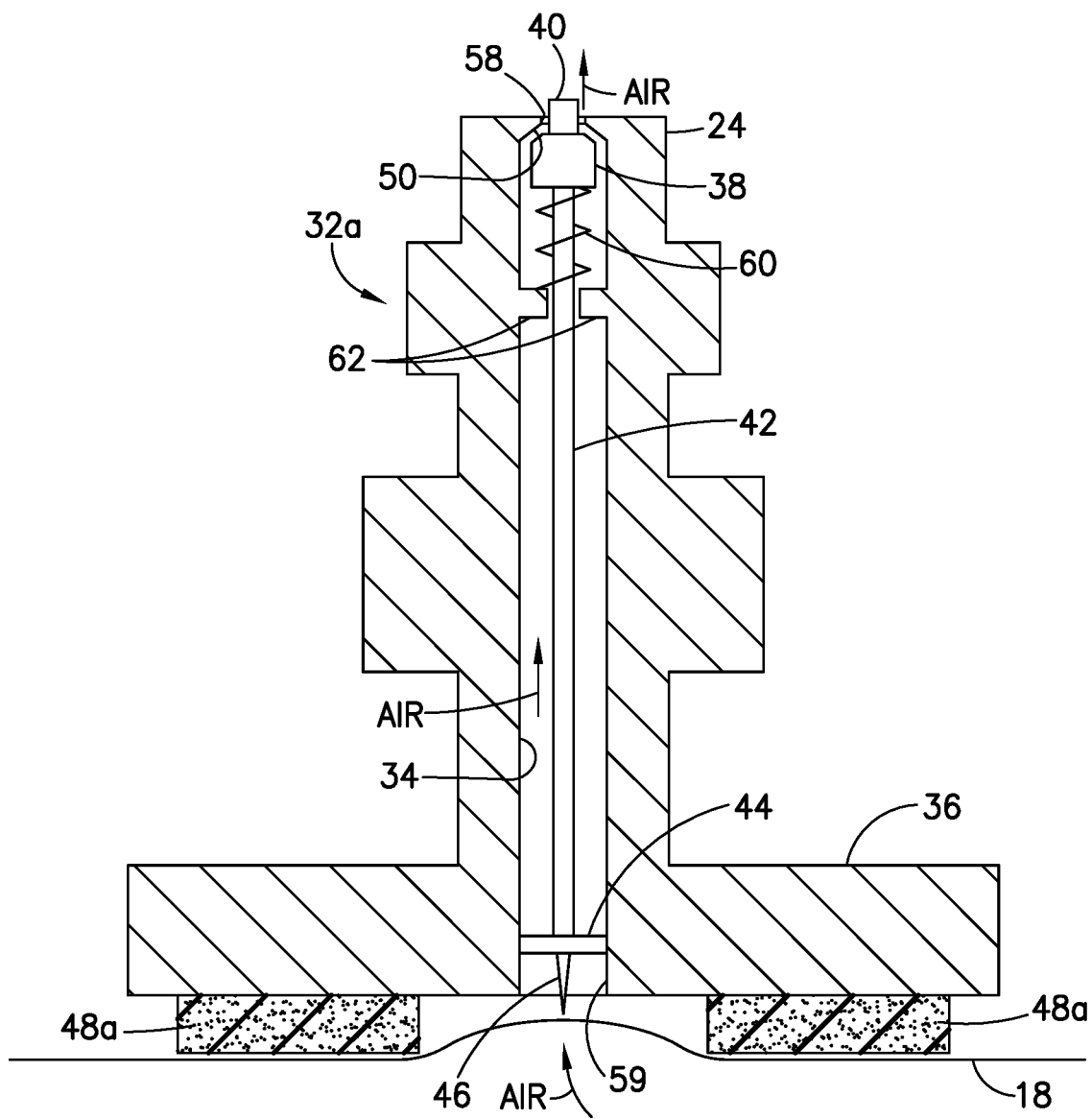
FIG. 2 is a diagram representing a partially sectional view of a vacuum probe in accordance with one embodiment.

FIG. 2 is a diagram representing a partially sectional view of a vacuum probe 32a comprising a male quick connect/disconnect coupling element 24 and a flat probe bottom part 36 in accordance with one embodiment. This vacuum probe 32a has a valve seat 50 that surrounds an opening 58 and a valve element 38 that bears against the valve seat 50 in the absence of a downward force sufficient to overcome the resistance of a spring 60 that urges the valve element 38 toward the valve seat 50. The spring 60 is seated on a spring seat 62, which may take the form of an inwardly directed annular flange inside the vacuum channel 34 of the vacuum probe 32a. In a closed state of the vacuum probe 32a, the valve element 38 bears against a valve seat 50 inside the vacuum probe 32a. FIG. 2 depicts a situation in which the valve element 38 is separated from the valve seat 50, which separation allows air to flow from the vacuum channel 34 out through opening 58 when vacuum pressure is applied at opening 58.

As seen in FIG. 2, the valve element 38 comprises a forward portion 40 which protrudes through opening 58. During quick connection, the end face of the forward portion 40 of the valve element 38 is acted upon by the valve core of the female quick connect/disconnect coupling element 26 of the vacuum hose 28. More specifically, the valve core (not shown in the drawings) forces the valve element 38 to displace downward and away from the valve seat 50. The valve element 38 is displaceable along an axis of the vacuum channel 34. This inward displacement causes the valve element 38 to move away from the valve seat 50, thereby opening the vacuum channel 34 inside the vacuum probe 32a. When the vacuum probe 32a is open, the sealed space underneath the vacuum bag 18 can be evacuated by applying vacuum pressure from the vacuum source 30 via the vacuum hose 28 and the vacuum probe 32a.

Still referring to FIG. 2, the vacuum probe 32a comprises a vacuum channel 34 having an axis and openings 58 and 59 at opposite ends thereof. The vacuum probe 32a further comprises a sharpened body 46 that points away from opening 58 of the vacuum channel 34 and projects outside of the vacuum channel 34 in a vicinity of opening 59. As previously mentioned, the vacuum probe 32a comprises: a valve seat 50 surrounding the opening 58 of the vacuum channel 34; a valve element 38 that is axially displaceable in the vacuum channel 34 between first and second axial positions, the valve element 38 being in contact with the valve seat while in the first axial (i.e., closed) position and being separated from the valve seat 50 while in the second axial (i.e., open) position; and a rod 42 disposed in the vacuum channel 34. The rod 42 has a first end to which the sharpened body 46 is fixedly coupled by means of an air-permeable sharpened body support element 44 and a second end that is connected to the valve element 38. In this embodiment, the sharpened body 46 is axially displaceable in tandem with the valve element 38 as the valve element 38 moves toward the second axial position. In addition, the sharpened body 46 projects outside the vacuum channel 34 when the valve element 38 is in the second axial position.

As seen in FIG. 2, when the vacuum probe 32a is added and sealed to the exterior surface of a vacuum bag 18 using donut-shaped sealing material 48a that is tacky on both sides, the vacuum probe 32a itself becomes a sealed-off environment. Different forms of sealing material can be utilized, such as sealing tape or a sealing gasket, provided that the sealing element has sufficient height to create a volume of space under the bottom of the vacuum probe 32a that allows the sharpened body 46 to project downward for puncturing the uplifted vacuum bag. The donut-shaped sealing material 48a may comprise a conformable, tacky, putty-like material for removably adhering the vacuum probe 32a to the exterior surface of the vacuum bag 18. In this regard, the donut-shaped sealing material 48a may comprise a partially cured rubber compound that is inherently tacky and that may be used to form an airtight seal between the vacuum probe 32a and the exterior surface of the vacuum bag 18. The donut-shaped sealing material 48a may be provided in a composition that is generally soft and pliable during room-temperature installation of the vacuum bag assembly 10, and at elevated temperatures associated with processing (e.g., curing or solidifying) the composite part 4.

Prior to quick connection of the vacuum probe 32a and the vacuum hose 28, the sharpened body 46 is recessed slightly (not shown in the drawings) inside the vacuum channel 34 for safety reasons, but is displaced downward and toward the vacuum bag 18 during vacuum hose quick connection. During quick connection, the sharpened body 46 and the valve element 38 move in tandem in the vacuum channel 34 until the sharpened body 46 projects through opening 59 and outside the vacuum channel 34, as depicted in FIG. 2. A vacuum pressure applied via the vacuum hose 28 pulls the vacuum bag 18 upwards and towards the sharpened body 46, which punctures the vacuum bag 18, thereby enabling air under the vacuum bag 18 to be evacuated via the vacuum probe 32a as vacuum pressure continues to be applied.

Figure 3:
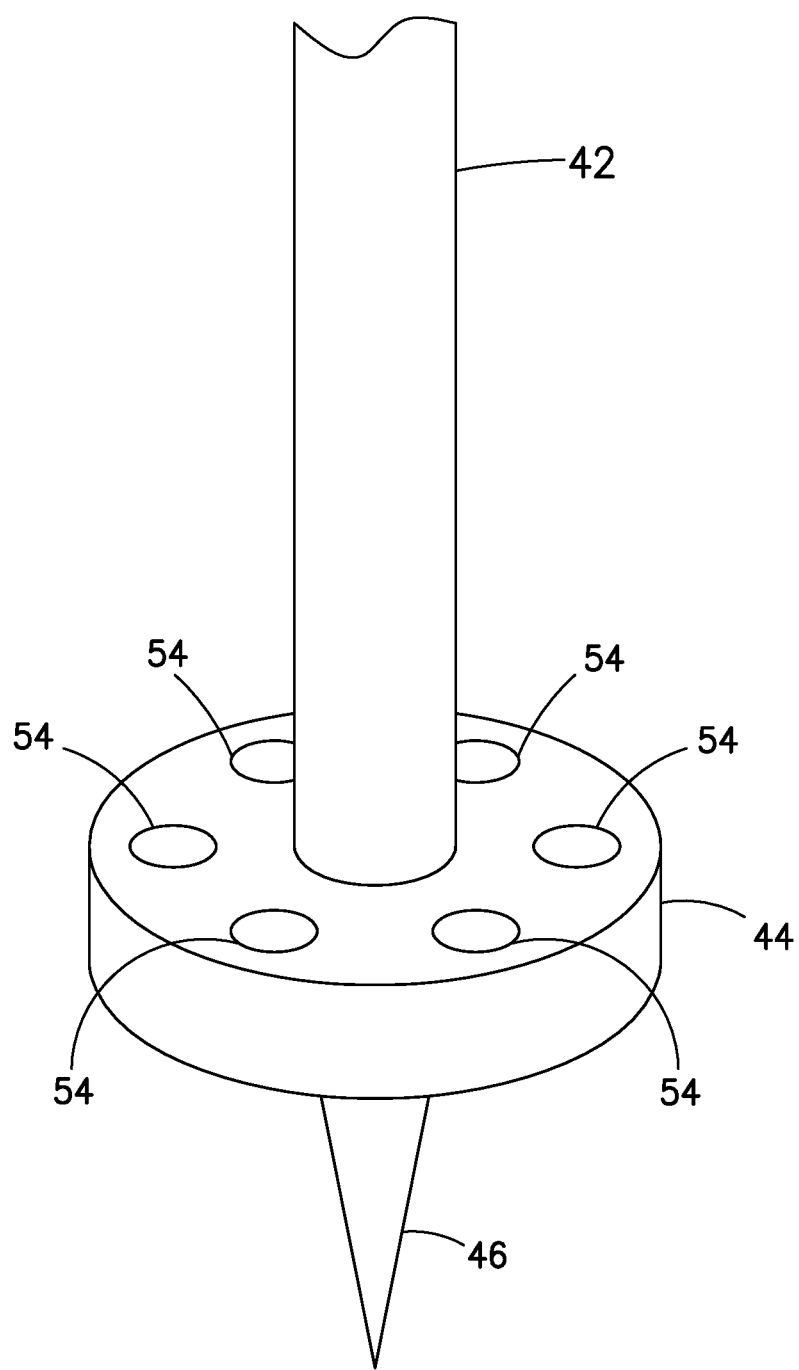
FIG. 3 is a diagram representing an orthographic view of a portion of a device which is incorporated in the vacuum probe depicted in FIG. 2 and which is designed to puncture a vacuum bag in response to vacuum hose hookup.

FIG. 3 is a diagram representing an orthographic view of a portion of a device which is incorporated in the vacuum probe 32a depicted in FIG. 2 and which is designed to puncture a vacuum bag 18 in response to a quick connection of vacuum probe 32a and vacuum hose 28. This device is an air-permeable sharpened body support element 44 in the form of a disk having six through-holes 54 which allow air to flow upward in the vacuum channel 34 during evacuation. The first end of rod 42 and the sharpened body 46 are affixed to the air-permeable sharpened body support element 44 to form a rigid assembly that displaces (e.g., slides) inside the vacuum channel 34 in tandem with the valve element 38 (not shown in FIG. 3). In accordance with alternative embodiments, the air-permeable sharpened body support element 44 may be in the form of a plug of porous material configured to slide up and down inside the vacuum channel 34.

Figure 4:
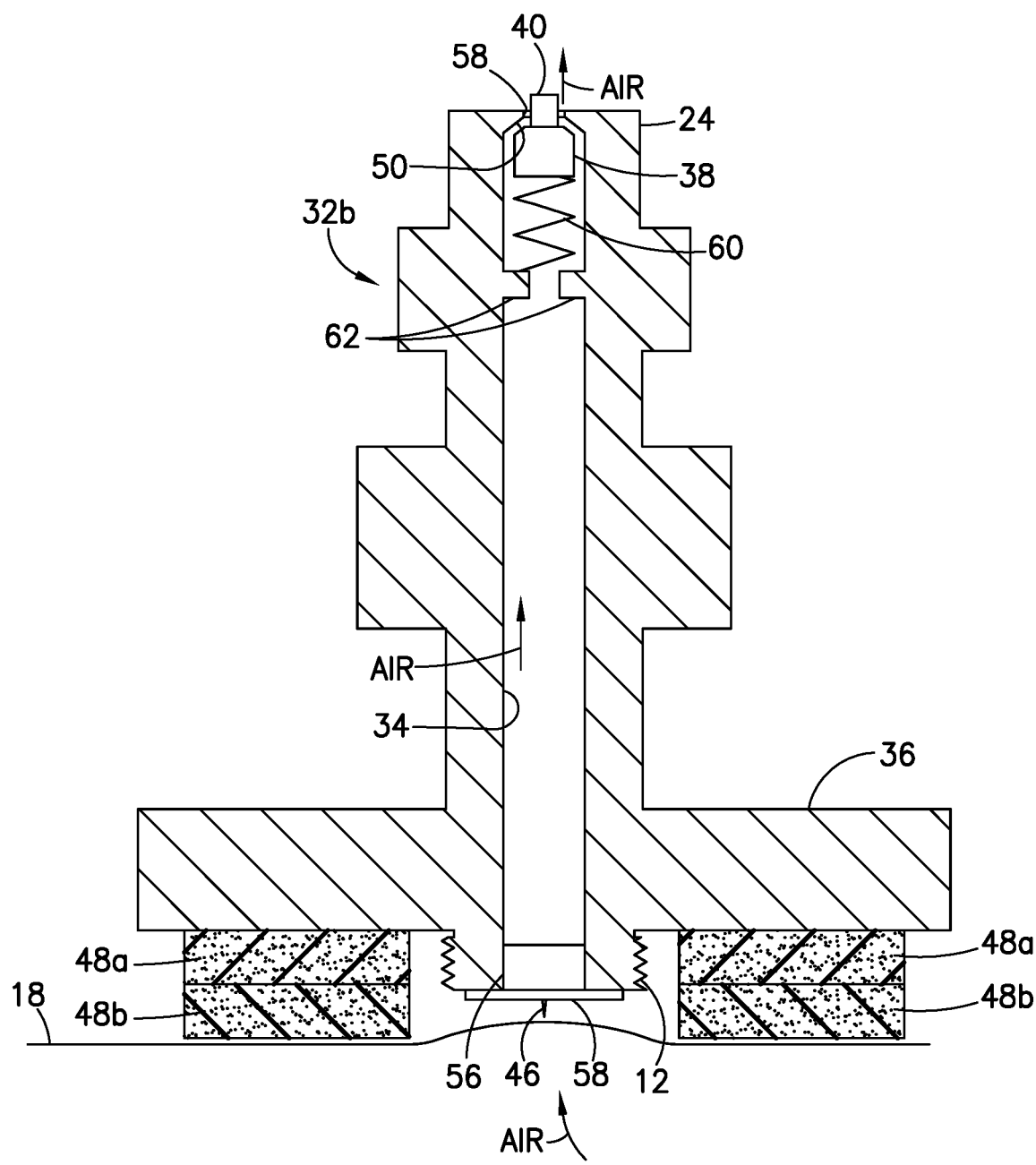
FIG. 4 is a diagram representing a partially sectional view of a vacuum probe in accordance with another embodiment.

FIG. 4 is a diagram representing a partially sectional view of a vacuum probe 32b in accordance with another embodiment. As seen in FIG. 4, when the vacuum probe 32b is added and sealed to the exterior surface of a vacuum bag 18 using a stack of two layers of donut-shaped sealing material 48a and 48b having adhesive on both sides, the vacuum probe 32b itself becomes a sealed-off environment. More than two layers of donut-shaped sealing material can be stacked.

As was the case in vacuum probe 32a depicted in FIG. 2, vacuum probe 32b has a valve seat 50 that surrounds an opening 58 and a valve element 38 that bears against the valve seat 50, which elements interact in the manner previously described. FIG. 4 depicts a situation in which the valve element 38 is separated from the valve seat 50, which separation allows air to flow from the vacuum channel 34 out through opening 58 when vacuum pressure is applied at opening 58. As seen in FIG. 4, the valve element 38 comprises a forward portion 40 which protrudes through opening 58. During quick connection, the end face of the forward portion 40 of the valve element 38 is acted upon by the valve core of the female quick connect/disconnect coupling element 26 of the vacuum hose 28 in the manner previously described with reference to FIG. 2 to cause the valve element 38 to move away from the valve seat 50, thereby opening the vacuum channel 34.

Still referring to FIG. 4, the vacuum probe 32b comprises an externally threaded portion 12 projecting downward from a bottom of the vacuum probe 32b. The vacuum channel 34 extends from opening 58 at the top of vacuum probe 32b to opening 59 at the bottom of the externally threaded portion 12. The externally threaded portion 12 projects into the space that is surrounded by the layers of donut-shaped sealing material 48a and 48b. A sharpened body 46 projects out of the vacuum channel 34 and beyond opening 59 formed in the bottom of the externally threaded portion 12. It should be appreciated that although vacuum probe 32b includes an externally threaded portion 12, the external threads are not used. This capability enables some existing vacuum probes having an externally threaded portion for threaded coupling with a base to be modified or supplemented to provide the vacuum bag puncturing capability disclosed herein without using a base (see, e.g., base 6 in FIG. 1).

In contrast to the vacuum probe 32a depicted in FIG. 2, the vacuum probe 32b depicted in FIG. 4 does not have a rod 42. Instead the vacuum probe 32b comprises an air-permeable sharpened body support element 56 in the form of a plug of porous material, which porous plug is inserted into the bottommost portion of the vacuum channel 34. In an alternative embodiment, the air-permeable sharpened body support element 56 which supports the sharpened body 46 may comprise a disk having a plurality of through-holes. Whether in the form of a plug or a disk, the material of the air-permeable sharpened body support element 56 should be sufficiently malleable to allow the plug or disk to be easily but securely press fit or wedged into the vacuum channel and easily removed. Preferably the air-permeable sharpened body support element 56 comprises an annular flange 58 that bears against a bottom surface of the externally threaded portion 12, serving to block further insertion of the plug or disk into the vacuum channel 34. In this embodiment, the sharpened body 46 is not recessed into the vacuum channel and instead projects downward toward the vacuum bag 18. When a vacuum pressure is applied via the vacuum hose 28 and vacuum probe 32b pulls the vacuum bag 18 upwards and towards the sharpened body 46, which punctures the vacuum bag 18. This puncture enables air underneath the vacuum bag 18 to be evacuated via the vacuum probe 32b as vacuum pressure continues to be applied.

Figure 5:
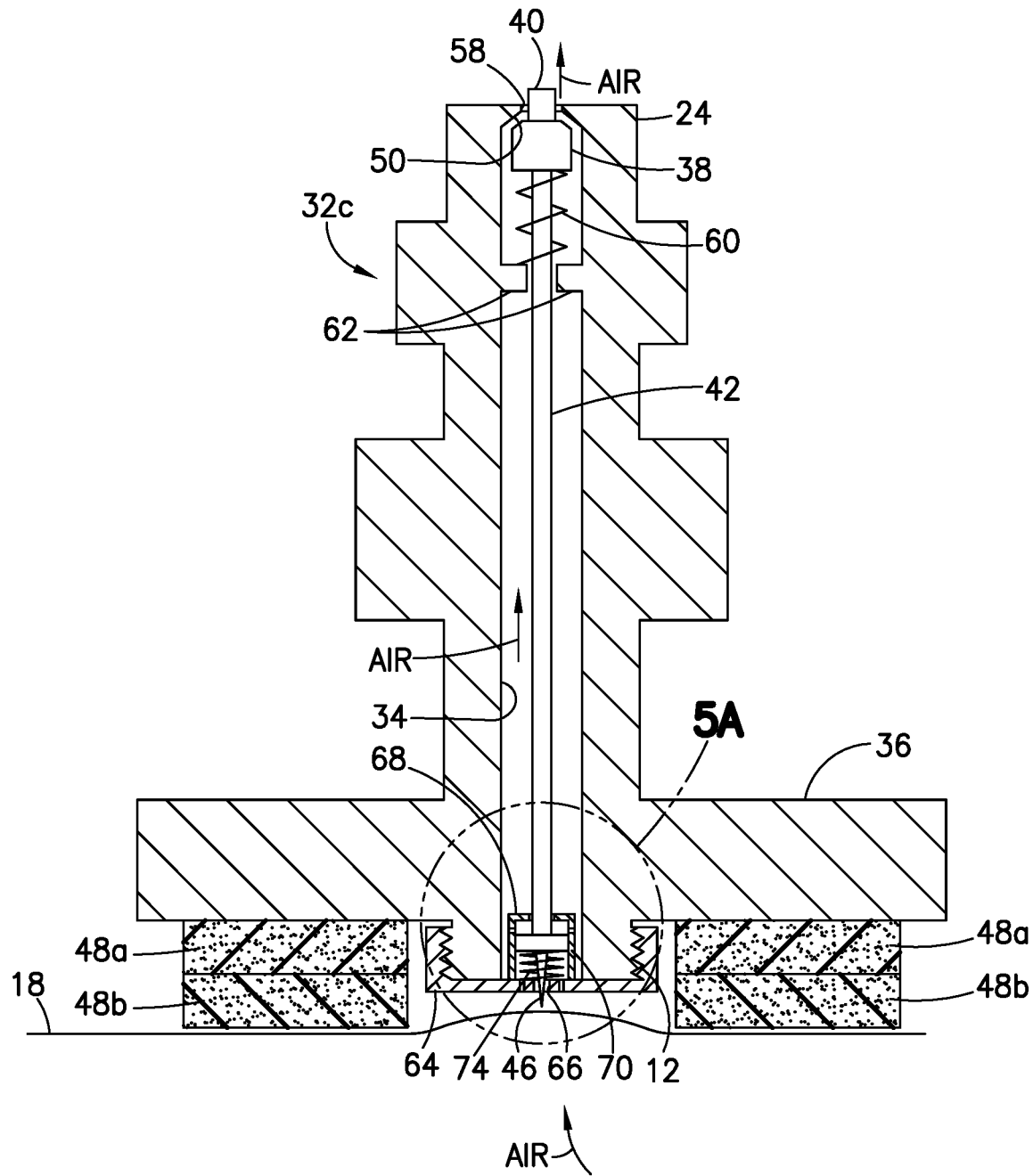
FIG. 5 is a diagram representing a partially sectional view of a vacuum probe in accordance with a further embodiment.
Figure 5A:
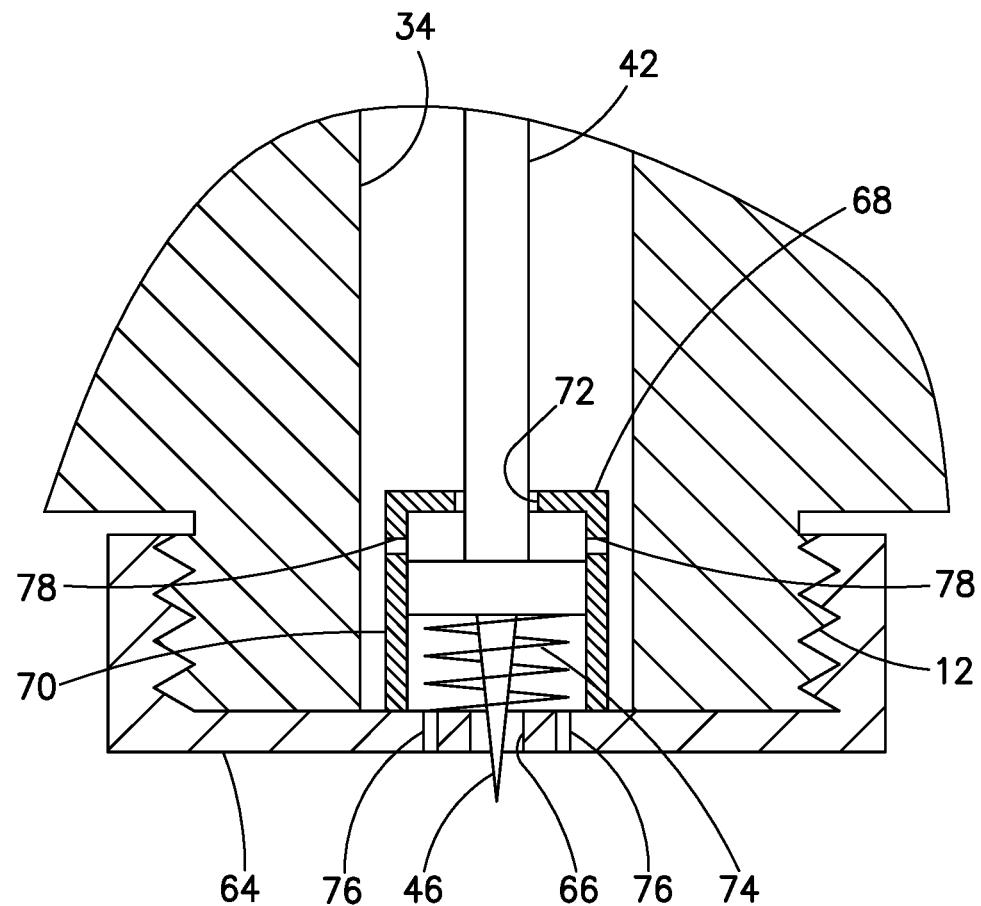
FIG. 5A is a diagram representing a magnified view of a portion of the vacuum probe depicted in FIG. 5.

FIG. 5 is a diagram representing a partially sectional view of a vacuum probe 32c in accordance with a further embodiment. FIG. 5A is a diagram representing a magnified view of a portion of the vacuum probe 32c depicted in FIG. 5. Except for the components depicted in FIG. 5A, the only other structural difference between vacuum probe 32b depicted in FIG. 4 and vacuum probe 32c depicted in FIG. 5 is that the upper end of the rod 42 seen in FIG. 5 is in abutment with, not connected to the valve element 38. This is a consequence of the fact that the rod 42 is inserted into the vacuum channel 34 from the bottom of a vacuum probe having an externally threaded portion 12 (e.g., of the type depicted in FIG. 1). However, as long as the end of the rod 42 is in contact with the valve element 38, then the sharpened body 46 will move downward in tandem with the valve element 38 during quick connection in the manner previously described. As will be explained in more detail with reference to FIG. 5A, a spring 74 urges the sharpened body 46 upward toward a recessed position (not shown in the drawings). When the sharpened body 46 moves downward in tandem with the valve element 38 during quick connection, the sharpened body 46 will reach a position in which its tip projects outside of the vacuum probe and is exposed to the uplifting outer vacuum bag 18.

FIG. 5A is a diagram representing a magnified view of a portion of the vacuum probe 32c depicted in FIG. 5. The vacuum probe 32c comprises an externally threaded portion 12 projecting downward from a bottom of the vacuum probe. The vacuum probe 32c further comprises an internally threaded end cap 64 that is threadably coupled to the externally threaded portion 12 and a chamber 68 which is affixed to the internally threaded end cap 64. The internally threaded end cap 64 comprises an opening 66 through which the sharpened body 46 passes when deployed, while the chamber 68 comprises an opening 72 through which the rod 42 passes.

The rod 42 has a bottom end affixed to an air-permeable sharpened body support element 70 and a top end (not shown in FIG. 5A, but see FIG. 5) that abuts the valve element 38. The air-permeable sharpened body support element 70 (which may, for example, be similar to the air-permeable sharpened body support element 44 depicted in FIG. 3) supports the sharpened body 46. In this embodiment, the sharpened body 46 is axially displaceable in tandem with the valve element 38 as the valve element 38 moves toward its second axial position. The air-permeable sharpened body support element 70 is configured to slide up and down inside the chamber 68. A spring 74 is disposed between the air-permeable sharpened body support element 70 and the internally threaded end cap 64 for urging the air-permeable sharpened body support element 70 upward. In the uppermost position of the air-permeable sharpened body support element 70 (not shown in FIG. 5A), the tip of the sharpened body 46 will be recessed (i.e., will not project below the bottom surface of the internally threaded end cap 64. In contrast, when the valve element 38 is displaced downward and reaches its second axial position, the tip of the sharpened body 46 will project below the bottom surface of the internally threaded end cap 64.

To facilitate the flow of air through the vacuum channel 34 during evacuation, the internally threaded end cap 64 may comprise through-holes 76 which allow air to flow into the chamber 68, while the chamber 68 may comprise through-holes 78 which allow air to flow out of the chamber 68 and into the vacuum channel 34. In alternative embodiments, the sharpened body support element is not air-permeable, in which case the through-holes 78 in the chamber 68 may be placed at a lower elevation, i.e., below the elevation of the bottom surface of the sharpened body support element when the latter is in its lowermost position.

The various embodiments disclosed in some detail above have the potential to provide cost savings due to time saved from bag reworking. Also the likelihood of optimal processing of composites during curing can be ensured by enabling the easy placement of additional vacuum probes when circumstances suggest that would be helpful.

While systems and methods for applying vacuum pressure to composite parts have been described with reference to various embodiments, it will be understood by those skilled in the art that various changes may be made and equivalents may be substituted for elements thereof without departing from the scope of the teachings herein. In addition, many modifications may be made to adapt the teachings herein to a particular situation without departing from the scope thereof. Therefore it is intended that the claims not be limited to the particular embodiments disclosed herein.

The method claims set forth hereinafter should not be construed to require that the steps recited therein be performed in alphabetical order (any alphabetical ordering in the claims is used solely for the purpose of referencing previously recited steps) or in the order in which they are recited unless the claim language explicitly specifies or states conditions indicating a particular order in which some or all of those steps are performed. Nor should the method claims be construed to exclude any portions of two or more steps being performed concurrently or alternatingly unless the claim language explicitly states a condition that precludes such an interpretation.

The invention claimed is:

1. A vacuum probe for applying vacuum pressure to a composite part, the probe comprising:
   a vacuum channel having an axis and first and second openings at opposite ends of the probe;
   a spring urging a valve element toward a valve seat arranged at the first opening, the valve element configured to displace away from the valve seat along the axis by quick connection with a vacuum hose so as to open the vacuum channel;
   a coupling element arranged on an outer surface of the probe for making said quick connection into a coupling element of the vacuum hose; and
   a sharpened body that points away from the first opening of the vacuum channel and projects outside of the vacuum channel in a vicinity of the second opening of the vacuum channel for puncturing an uplifted vacuum bag laid over the composite part.

2. The vacuum probe as recited in claim 1, wherein:
   the valve seat surrounds the first opening of the vacuum channel,
   the valve element is axially displaceable in the vacuum channel between first and second axial positions, the valve element being in contact with the valve seat while in the first axial position and being separated from the valve seat while in the second axial position,
   the probe further comprises a rod disposed in the vacuum channel, the rod having a first end to which the sharpened body is fixedly coupled and a second end that is either connected to or in abutment with the valve element, and
   the sharpened body is axially displaceable in tandem with the valve element as the valve element moves toward the second axial position, the sharpened body projecting outside the vacuum channel when the valve element is in the second axial position.

3. The vacuum probe as recited in claim 2, wherein the second end of the rod is connected to the valve element, the probe further comprising an air-permeable sharpened body support element to which the first end of the rod and the sharpened body are affixed.

4. The vacuum probe as recited in claim 3, wherein the air-permeable sharpened body support element is a disk having at least one through-hole.

5. The vacuum probe as recited in claim 2, further comprising:
   an externally threaded portion having a portion of the vacuum channel disposed therein; and
   an air-permeable sharpened body support element seated inside the portion of the vacuum channel that is disposed in the externally threaded portion and to which the sharpened body is affixed.

6. The vacuum probe as recited in claim 2, wherein the second end of the rod is in abutment with the valve element, further comprising a spring that urges the rod toward the valve element.

7. The vacuum probe as recited in claim 2, further comprising an externally threaded portion projecting downward from a bottom of the vacuum probe, an internally threaded end cap threadably coupled to the externally threaded portion, and a chamber affixed to the internally threaded end cap, wherein the internally threaded end cap comprises an opening through which the sharpened body passes, and wherein the chamber comprises an opening through which the rod passes.

8. The vacuum probe as recited in claim 7, wherein the internally threaded end cap comprises through-holes which allow air to flow into the chamber, and wherein the chamber comprises through-holes which allow air to flow out of the chamber and into the vacuum channel.

9. A system for applying vacuum pressure to a composite part, the system comprising:
   a tool that supports a composite part;
   a vacuum bag overlying the composite part supported by the tool;
   a flexible sealant tape that seals the vacuum bag to the tool along a perimeter that surrounds the composite part;
   sealing material on an exterior surface of the vacuum bag within the perimeter and separated from the composite part;
   the vacuum probe of claim 1 on top of the sealing material, wherein the valve element is axially displaceable in the vacuum channel between a first axial position in contact with the valve seat and a second axial position separated from the valve seat; and
   a vacuum hose coupled to an end of the vacuum probe in a manner that causes the valve element to axially displace from the first axial position to the second axial position.

10. The system as recited in claim 9, further comprising a rod having a first end to which the sharpened body is fixedly coupled and a second end that is either connected to or in abutment with the valve element, wherein the sharpened body is axially displaceable in tandem with the valve element as the valve element moves toward the second axial position, the sharpened body projecting into a space surrounded by the sealing material when the valve element is in the second axial position.

11. The system as recited in claim 10, wherein the second end of the rod is connected to the valve element, the system further comprising an air-permeable sharpened body support element to which the first end of the rod and the sharpened body are affixed.

12. The system as recited in claim 9, further comprising:
   an externally threaded portion having a portion of the vacuum channel disposed therein; and
   an air-permeable sharpened body support element seated inside the portion of the vacuum channel that is disposed in the externally threaded portion and to which the sharpened body is affixed.

13. The system as recited in claim 12, wherein the air-permeable sharpened body support element is a plug made of porous material.

14. The system as recited in claim 9, wherein the vacuum probe further comprises:
   an externally threaded portion projecting into the space surrounded by the sealant tape;
   an internally threaded end cap threadably coupled to the externally threaded portion of the vacuum probe; and
   a chamber affixed to the internally threaded end cap, wherein the internally threaded end cap comprises an opening through which the sharpened body passes, and wherein the chamber comprises an opening through which the rod passes.

15. The system as recited in claim 14, wherein the internally threaded end cap comprises through-holes which allow air to flow into the chamber, and wherein the chamber comprises through-holes which allow air to flow out of the chamber and into the vacuum channel.

16. A method for applying vacuum pressure to a composite part, the method comprising:
   (a) placing a composite part on a tool;
   (b) placing a sealant tape on the tool along a perimeter that surrounds the composite part;
   (c) laying a vacuum bag over the composite part and in contact with the sealant tape;
   (d) placing the vacuum probe of claim 1 overlying a portion of the vacuum bag with sealing material disposed between the vacuum probe and the vacuum bag;
   (e) coupling a vacuum hose to an end of the vacuum probe in a manner that causes the valve element to separate from the valve seat inside the vacuum channel of the vacuum probe; and
   (f) applying a vacuum pressure inside the vacuum channel by way of the vacuum hose, as a result of which a portion of the vacuum bag surrounded by the sealing material is pulled toward and punctured by the sharpened body.

17. The method as recited in claim 16, wherein coupling the vacuum hose to the end of the vacuum probe also causes the sharpened body to move in tandem with the valve element in a direction away from the valve seat until the sharpened body protrudes outside the vacuum channel and into a space overlying the vacuum bag.

18. The method as recited in claim 17, wherein the sharpened body is connected to a rod that is connected to the valve element.

19. The method as recited in claim 17, wherein the sharpened body is connected to a rod that butts against and is not connected to the valve element.

20. The method as recited in claim 16, wherein the coupling element of the vacuum probe is a male quick connect/disconnect coupling element and the coupling element of the vacuum hose is a female quick connect/disconnect coupling element, and wherein step (e) comprises inserting the male quick connect/disconnect coupling element of the vacuum probe into the female quick connect/disconnect coupling element of the vacuum hose.

21. The method as recited in claim 16, wherein the vacuum probe comprises an externally threaded portion that projects into a space bounded by the sealing material.

22. The method as recited in claim 21, further comprising threadably coupling an internally threaded end cap to the externally threaded portion of the vacuum probe, wherein the sharpened body projects through an opening in and is axially displaceable relative to the internally threaded end cap.

23. The method as recited in claim 21, further comprising inserting a portion of a plug made of porous material in a portion of the vacuum channel disposed in the externally threaded portion of the vacuum probe, wherein the sharpened body projects from the plug.

\* \* \* \* \*